W. CLIMIE.

GAS PRODUCER.

APPLICATION FILED APR. 12, 1920.

Reissued Mar. 8, 1921.

15,057.

2 SHEETS—SHEET 1.

William Climie Inventor

By his Attorneys

Prindle, Wright & Small

NORRIS PETERS, INC., LITHO., WASHINGTON, D. C.

W. CLIMIE.

GAS PRODUCER.

APPLICATION FILED APR. 12, 1920.

Reissued Mar. 8, 1921.

15,057.

2 SHEETS—SHEET 2.

William Climie Inventor

By his Attorneys

Brindle, Wright & Small

UNITED STATES PATENT OFFICE.

WILLIAM CLIMIE, OF BO'NESS, SCOTLAND, ASSIGNOR OF ONE-FIFTH TO CHAPMAN ENGINEERING COMPANY, OF MOUNT VERNON, OHIO, A CORPORATION OF NEW YORK.

GAS-PRODUCER.

15,057. Specification of Reissued Letters Patent. Reissued Mar. 8, 1921.

Original No. 1,040,148, dated October 1, 1912, Serial No. 649,002, filed September 13, 1911. Application for reissue filed April 12, 1920. Serial No. 373,434.

*To all whom it may concern:*

Be it known that I, WILLIAM CLIMIE, a subject of the King of Great Britain and Ireland, and a resident of Bo'ness, Linlithgowshire, Scotland, have invented new and useful Improvements in Gas-Producers, of which the following is a specification.

This invention has reference to and comprises improvements in gas producers.

In order that my said invention and the manner of carrying same into effect or practice may be properly understood I have hereunto appended two sheets of explanatory drawings in which—

Figure 1:
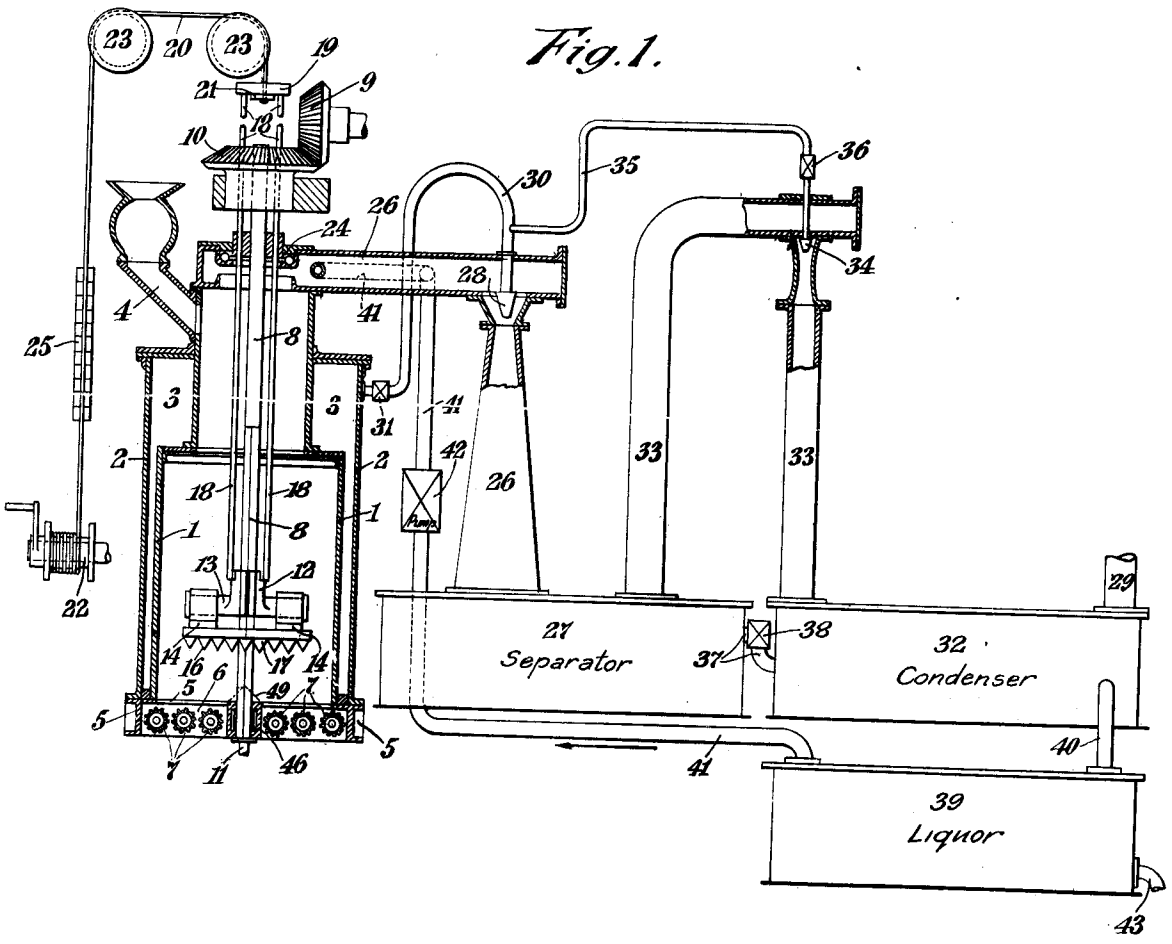
Figure 2:
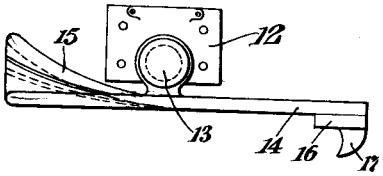
Figure 3:
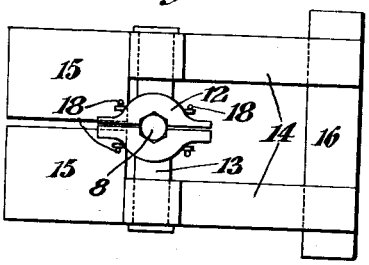
Figure 4:
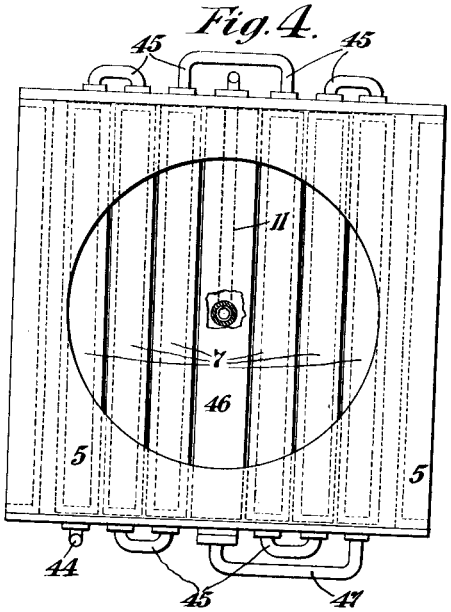
Figure 5:
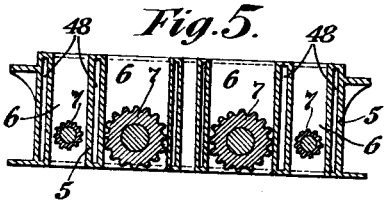
Figure 7:
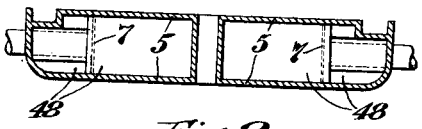
Figure 6:
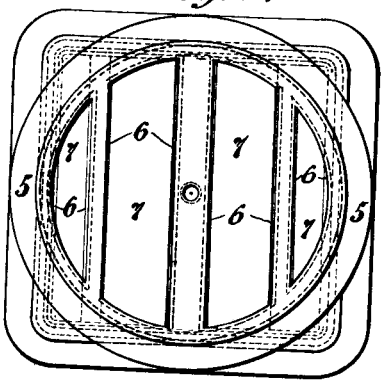
Figure 8:
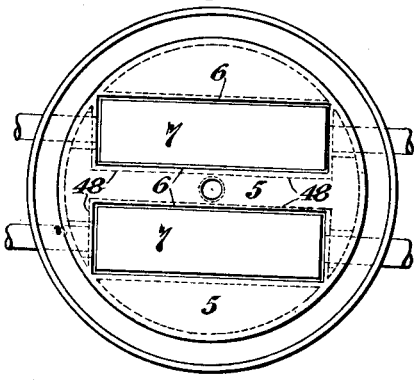

Figure 1 is an elevation partly in section of a gas producer constructed according to my improvements. Figs. 2 and 3 are respectively, an elevation and a plan view of the rake, while Fig. 4 is a plan view of the grate. Figs. 5 and 7 are respectively sectional elevations of slightly modified forms of grate, while Figs. 6 and 8 are corresponding plan views.

Referring to these drawings:—This improved gas producer is composed of an inner casing 1 and an outer casing 2. The fuel is contained within the inner casing and water is introduced by any suitable means, such as by a pump or by gravity, into the space 3 between the casings 1 and 2. The fuel is charged into the casing 1 by a chute 4 fitted with a valve of the usual form which is not illustrated as its construction is well known. The grate consists of a casing 5 formed with a space 6 within which toothed rollers 7 are continuously rotated so as to discharge the ashes and prevent the formation of clinker. The number of rollers 7 may be varied if desired and as shown by Figs. 1 and 4 are preferably formed hollow so that water may be passed through them. The water is introduced into the first roller by means of a pipe 44 then passed through the other rollers in sequence by pipes 45 and led from the last roller to a central hollow bar 46 by a pipe 47 and then passed from this bar 46 to a vertical tube 8 by a pipe 11.

If desired and as indicated by dotted lines 49 the top surface of the center bar 46 may be formed of a double incline or inverted V shape in order to assist the movement of the ashes toward the rollers 7.

The vertical tube or support 8 is fitted centrally within the casing 1 and continuously rotated by gearing 9, 10. Water is circulated through this tube in order to keep same cool by the pipe 11 as before mentioned and discharged at or near the top by any convenient means. The lower portion of the tube 8 is preferably of hexagonal form in section and a boss 12 formed with projecting arms 13 is mounted on same so as to rotate with the tube 8 but is capable of vertical movement thereon. Bars 14 formed with curved tail pieces or cams 15 are mounted on the arms 13 and a bar 16 formed with teeth 17 on its under surface is fitted to the ends of said bars 14. It will be readily understood that as the rake (that is the mechanism marked 12 to 17) is rotated by the tube 8 the tail pieces or cams 15 cause same to ride at or in the surface of the fuel; when fuel is charged into the producer, the curves of the tail pieces or cams 15, by engagement of their forwardly directed curved surfaces with the fresh fuel, cause the rake to be raised immediately to a level corresponding to that of the fresh fuel; or if the level of fuel falls, the rake will slide down a corresponding distance on tube 8. Rods 18 fitted to the boss 12 at their lower end, are connected together by a cross-head 19 at their upper end. One end of a wire rope 20 is connected to this crosshead 19 by a ball bearing joint 21, while the other end is attached to a winch 22 or its equivalent. The rope 20 from the crosshead 19 to the winch 22 passes over suitable placed guide pulleys 23. The rods 18 pass through the wheel 10 and are rotated with it and where they pass out of the gas producer casing a suitably constructed gas-tight and ball bearing joint 24 is fitted. The winch 22 and rope 20 are for the purpose of raising the rake in order to clean the tube 8 from the carbon that collects on it. In order that the position of the rake in the fuel chamber may be known a suitably constructed indicator 25 may be fitted.

The gas is led from the fuel chamber by a pipe 26 fitted at its upper end to a vessel 27 where the tar and ammonia compounds are separated from it. Steam is injected into a convenient part of the pipe 26 by an injector or the like 28 so as to scrub the gas, draw it from the gas producer and force it through the separating vessel 27 and condenser 32. Steam is supplied to this injector from the chamber 3 by means of a pipe 30 and valve 31. The gas is led from the separator 27 into another vessel or condenser 32 by means of a pipe 33. An injector 34 placed in a suitable position in this pipe 33 subjects the gas to a second scrubbing action and insures the extraction of any impurities which may have ascended from the chamber 27. The steam is supplied to this injector 34 by a pipe 35 and valve 36 from the pipe 30. The purified gases may be drawn off from the condenser by the pipe 29 utilized for various purposes such as heating, driving, or lighting.

The strong ammoniac liquors in the vessel 27 are passed to the condenser 32 by means of a pipe 37 and valve 38 of usual form and from the condenser to a tank 39 by means of a pipe 40. The liquors are then drawn from the tank 39 through a line of piping 41 by means of a pump 42 and delivered into the pipe 26 in the form of a spray in order that the gas from the producer may be washed.

When the liquors have reached the required strength they may be drawn off from the tank 39 by the pipe 43.

As shown by Figs. 5 and 6 the rollers 7 instead of being formed hollow for the passage of water are solid and rotate in the spaces 6 between water jackets 48. Four rollers are shown in Figs. 5 and 6 while Figs. 7 and 8 illustrate a suitable construction for two rollers.

I claim—

1. The combination in a gas producer of a fuel rake; means for rotating the rake in a constant direction; means for allowing the rake to fall during the said rotary motion; and means operable upon the fuel and moved by the said rotating means for effecting a movement of the rake upwardly with the fuel.

2. The combination in a gas producer of a fuel rake; means for moving the rake in a constant direction to rake the fuel; means for allowing the rake to fall during the said constant movement; and means moved by said constant moving means to raise the rake upwardly with the fuel.

3. The combination in a gas producer of a fuel rake; means for moving the rake in a constant direction to rake the fuel; means for allowing the rake to fall during the said constant movement, and means carried by the said rake and moved by the said constant moving means to raise the rake upwardly with the fuel.

4. The combination, in a gas producer, of a fuel rake; means for imparting a rotary movement in a constant direction to the rake, said rake having a cam surface operable against the fuel during the rotary movement of the rake to simultaneously move the rake upwardly with the fuel to rake the latter; and means for lowering the fuel to effect a downward movement of the rake.

5. The combination of a gas producer having a casing providing a fuel chamber, of a tube rotatably mounted in the casing and extending through the fuel chamber; means for rotating the tube, a rake slidably keyed to the tube and a cam on the rake positioned to act upon the fuel and thereby slide the rake upwardly along the tube during the rotary movement of the said tube.

6. The combination of a gas producer having a casing providing a fuel chamber, of a member rotatably mounted in the casing and extending through the fuel chamber; a rake slidably keyed to the said member; a cam on the rake positioned to act upon the fuel and thereby slide the rake upwardly along the member; and means for automatically discharging the ashes to allow the rake to be lowered.

7. The combination of a gas producer having a casing providing a fuel chamber, of a tube rotatably mounted in the casing and extending through the fuel chamber; a rake slidably keyed to the tube; a cam on the rake positioned to act upon the fuel and thereby slide the rake upwardly along the tube; a grate; and means for automatically moving the grate to discharge the ashes and thereby allow the rake to move downwardly.

8. The combination in a gas producer having a casing providing a fuel chamber, of a tube rotatably mounted in the casing and extending in the fuel chamber; a rake slidably keyed to the tube; a cam on the rake positioned to act upon the fuel and thereby slide the rake upwardly along the tube; and means independent of the said cam for sliding the rake upwardly along the tube.

9. The combination in a gas producer having a casing providing a fuel chamber of a tube rotatably mounted in the casing and extending in the fuel chamber; a rake slidably keyed to the tube; a cam on the rake positioned to act upon the fuel and thereby slide the rake upwardly along the tube; slidable rods extending through said casing and connected to the rake; a rope having one end attached to the rods; guides for the rope; a winch to which the other end of the rope is attached; and an indicator positioned to determine the position of the rake within the fuel chamber.

10. The combination in a gas producer of a fuel rake rotatable relative to the fuel bed, means for producing such rotary motion in a constant direction, means for allowing the rake to fall during the said rotary motion, and means operable upon the fuel and moved by the said rotating means for maintaining the rake in the surface of the fuel bed when the level of the fuel bed rises.

11. The combination in a gas producer of a fuel rake rotatable relative to the fuel bed, means for producing such a rotary motion in a constant direction to rake the fuel, means for allowing the rake to fall during the said constant movement, and means moved by said constant moving means to maintain the rake in the surface of the fuel bed when the level of the fuel bed rises.

12. The combination in a gas producer of a fuel rake rotatable relative to the fuel bed, means for producing such rotary motion in a constant direction to rake the fuel, means for allowing the rake to fall during the said constant movement, and means carried by said rake and moved by said constant moving means to maintain the rake in the surface of the fuel bed when the level of the fuel bed rises.

13. The combination in a gas producer of a fuel rake rotatable relative to the fuel bed, means for producing such rotary motion in a constant direction, said rake having a cam surface operating against the fuel during the rotary movement of the rake to maintain the rake in the surface of the fuel and move the rake upwardly when the level of the fuel bed rises, and means for lowering the fuel to effect a downward movement of the rake to correspond with a lower level of the fuel bed.

In testimony whereof, I have signed my name to this specification, in the presence of two subscribing witnesses.

WILLIAM CLIMIE.

Witnesses:

JOHN STEWART,

ELLA GLOAG.